United States Patent
Feyh et al.

(10) Patent No.: US 9,813,111 B2
(45) Date of Patent: Nov. 7, 2017

(54) PHANTOM MODE DATASTREAM TRANSMISSION

(71) Applicant: AVAGO TECHNOLOGIES GENERAL IP (SINGAPORE) PTE. LTD., Singapore (SG)

(72) Inventors: German Stefan Otto Feyh, Boulder, CO (US); Kishore Kota, Aliso Viejo, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 15/018,511

(22) Filed: Feb. 8, 2016

(65) Prior Publication Data

US 2017/0155424 A1   Jun. 1, 2017

Related U.S. Application Data

(60) Provisional application No. 62/260,598, filed on Nov. 29, 2015.

(51) Int. Cl.
*H04B 3/04* (2006.01)
*H04L 25/03* (2006.01)

(52) U.S. Cl.
CPC .............. *H04B 3/04* (2013.01); *H04L 25/03* (2013.01)

(58) Field of Classification Search
USPC ................................................. 375/329, 257
See application file for complete search history.

(56) References Cited

U.S. PATENT DOCUMENTS

| | | | | |
|---|---|---|---|---|
| 7,962,118 | B2* | 6/2011 | Schwager | H04B 3/54 340/12.32 |
| 8,125,812 | B2* | 2/2012 | Streibl | G06F 1/10 365/189.09 |
| 2002/0080010 | A1* | 6/2002 | Zhang | H04B 3/542 375/257 |
| 2013/0201006 | A1* | 8/2013 | Kummetz | H04Q 1/138 340/10.1 |
| 2014/0036653 | A1* | 2/2014 | Moons | H04L 5/20 370/200 |
| 2014/0185701 | A1* | 7/2014 | Liang | H04B 7/0456 375/295 |
| 2015/0256222 | A1* | 9/2015 | Schwager | H04B 3/54 375/257 |

OTHER PUBLICATIONS

Albert, A.L., Chapter 6—Transmission Lines, Electrical Communication, 1934, pp. 190-234, Third Edition, John Wiley & Sons, Inc., New York, New York.
Barry, et al., Digital Communication, vol. 1, Springer Science & Business Media, 2004, pp. 365-369.

* cited by examiner

*Primary Examiner* — Eva Puente
(74) *Attorney, Agent, or Firm* — Oblon, McClelland, Maier & Neustadt, L.L.P.

(57) ABSTRACT

A system may concurrently transport datastreams over the common, differential and phantom modes of pair conductor media. The system may implement the phantom mode transport using the differential of multiple common modes. In multiple conductor pair implementations, multiple phantom modes may share a single return signal route. In some implementations, usage of common modes and phantom modes may be paired with schemes to increase signal robustness.

19 Claims, 6 Drawing Sheets

PHANTOM MODE DATASTREAM TRANSMISSION

PRIORITY CLAIM

This application claims priority to provisional application Ser. No. 62/260,598, filed Nov. 29, 2015, which is entirely incorporated by reference.

TECHNICAL FIELD

This disclosure relates to a system for common and differential mode signaling for data transmission.

BACKGROUND

High-speed data paths are a crucial part of what is now indispensable worldwide data connectivity. The data paths may be implemented using various physical media or communication lines. There are substantial challenges, however, involved in further increasing data rates using previously installed media. Architectures and techniques that increase throughput over existing communication lines will help enhance the communication capabilities of high-speed communication devices.

DETAILED DESCRIPTION

Figure 1:
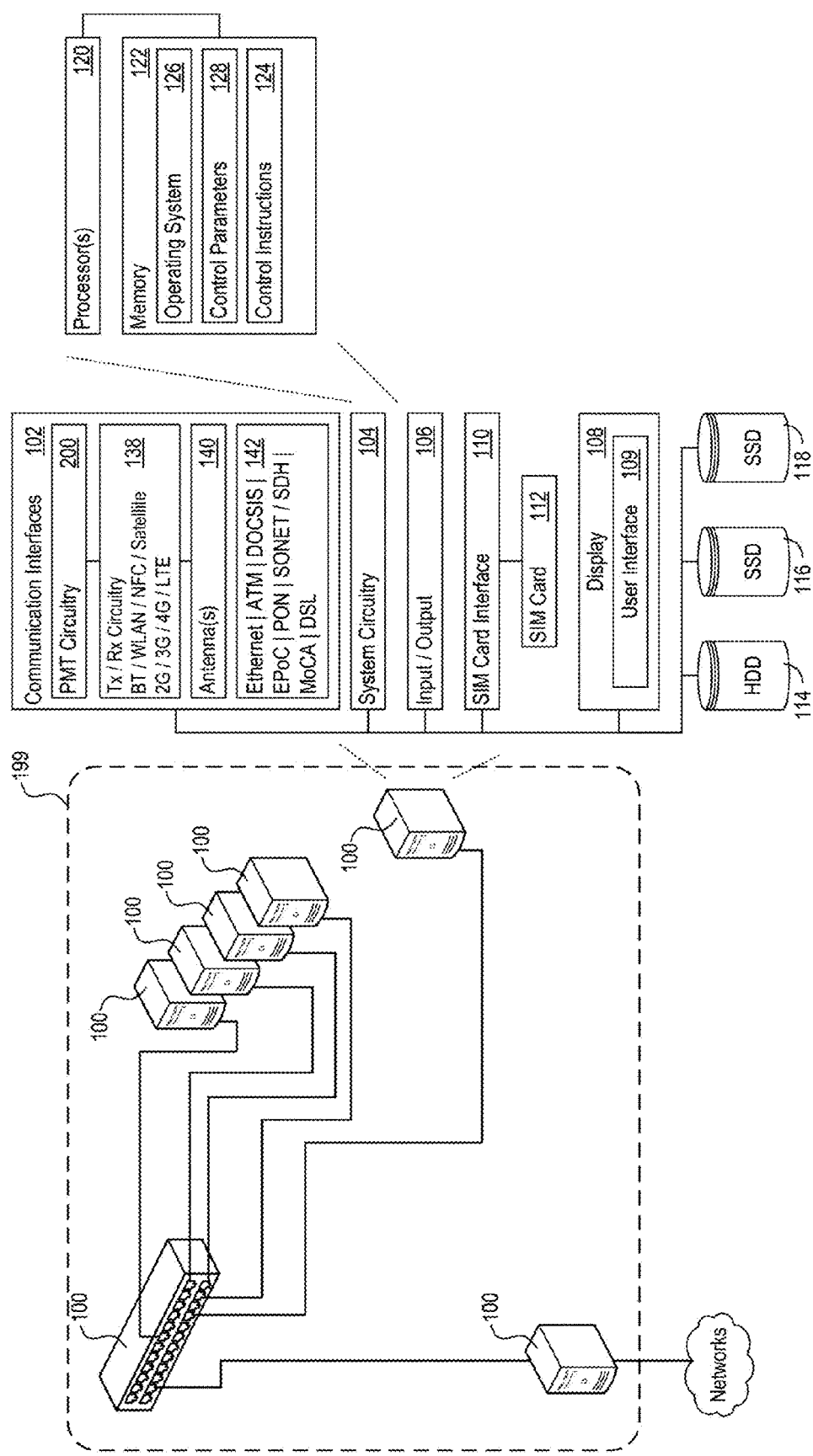
FIG. 1 shows an example network node within a network.

Communication systems may rely on physical transport over conductor pairs, such as a wire pair, or other paired conductor transmission media. For example, various Ethernet deployments implement twisted pair cable, e.g., CAT5, CAT5e, CAT6, CAT7 or other cable standards, coaxial cable, or other cables fashioned with paired (or multi-paired) conductors. In some cases, differential mode signals may be sent over one or more pairs of the paired conductors. For example, a signal level of +N volts may be provided to a first of the paired conductors and a signal level of −N volts may be provided to a second of the paired conductors. In some cases, the positive and negative portions of the differential signal are synchronized in time such that opposite voltage level values are present on the members of the conductor pair regardless of level shifts.

The signaling information within a differential signal may be detected by comparing absolute levels of one or more differential conductors. Additionally or alternatively, differential signals may be detected by detecting signal level shifts of opposite polarity. In some cases, the absolute voltage levels on either conductor of an example conductor pair may be ignored. Hence, DC level shifts may be applied to differential signals and differential signaling can be enabled where the conductor pair exhibit opposite polarity shifts but may not necessarily have opposite absolute voltage levels for any given time period.

Differential mode signaling may be paired with common mode signaling on conductor pairs. In common mode signaling, the conductor pairs may exhibit the same polarity shift in unison. In some cases, a common mode signal may be paired with a return mode signal on a second conductor or multiple second conductors to avoid net transfers of energy between signal nodes on a network.

Differential and common mode signaling may be orthogonal such that concurrent datastreams may be sent over both the differential and common modes on, for example, a single pair of conductors. The common mode and differential mode signals may be separated at the receiver side.

In some cases, a signal may be sent as the differential of two or more common mode signals. Thus, for example, a common mode signal may be sent over a first pair of conductors and a return signal, opposite in polarity, may be sent over a second pair of conductors. This may be referred to as phantom mode signaling.

In an Ethernet cable with four twisted wire pairs bundled within an outer jacket, up to four differential mode signals may be transported over the cable. Up to four common mode signals may be transported along with the four differential mode signals.

For example, three common mode signals may be sent over three of the pairs, while the fourth pair transports the return signal for the common mode signals to support three phantom mode datastreams.

In another example, four common mode signals may be sent over the four pairs, while return signals may be sent over a shielding layer for the cable or shielding layers for the individual twisted pairs. The return signal may include the sum of the return current from the signals sent over the common modes of the pairs. The return signals may not necessarily travel the full path back from receiver to transmitter, but may be connected to a ground on one or more sides. The return signals may be used by the system to prevent a net transmission of charge from the transmitter or receiver or vice versa. Allowing transmitted current to flow to a ground may facilitate the removal of net charge transmissions. Additionally or alternatively, providing a full return loop between the transmitter and receiver may facilitate the removal of net charge transmissions.

To increase signal robustness, an equalizer may be coupled to a transceiver to detect a channel state for the differential and common modes. In some cases, the equalizer may determine the insertion loss for particular frequency regions for common or differential mode signaling. When regions of degraded transmission within the transmission spectrum of the physical medium are detected by the equalizer, the equalizer may alter the transmission profile of the common or differential modes to avoid the degraded transmission region. For example, the equalizer may shift a carrier frequency of a common or differential mode signal or adjust a transmission bandwidth of a common or differential mode signal. This alteration of the transmission profile may create a "notch" in the transmission spectrum that coincides with the degraded transmission region. Degraded transmission regions may, for example, include bands with lower signal-to-noise ratios when compared to other bands, bands with higher bit error rates or symbol error rates when compared to other bands, or regions with below threshold channel state metrics, such as threshold-exceeding signal-to-noise ratios, bit error rates, or symbol error rates.

Additionally or alternatively, coding schemes with lower peak-to-average ratios may be used for common mode or differential mode signaling. For example, "dirty paper" coding techniques may be used. Dirty paper coding techniques may include coding schemes where the signal defaults to a high signal state and data is modulated onto the stream by carving out valleys rather than transmitting peaks—similar to using a white crayon to markup a darkened page.

In some cases, decision-feedback equalization (DFE) may be implemented. For example, when symbols are identified by receiver circuitry, the receiver circuitry may use the previously identified symbols to guide identification of future symbols. For example, the previously identified symbols may be used as filter inputs for processing of later received symbols. In some cases, DFE may allow a system to adapt to time-varying noise or interference conditions, by maintaining a feedback-driven evolving symbol filter system. Rather than having a static definition for the various symbols used in the communication scheme, a DFE system may change using newly received symbols to update the definitions as signaling conditions change.

In some cases, when the receiver circuitry misidentifies a symbol, the receiver circuitry may alter its symbol definitions improperly. Thus, the receiver circuitry's accuracy in symbol identification may be reduced. In some cases, this reduction in DFE accuracy may be attributed to postcursor inter-symbol interference (ISI). In an implementation, Tomlinson-Harashima Precoding (THP) may be used by transmitter circuitry sending symbols to DFE receiver circuitry. For example, THP transmitter circuitry may precode symbols to cancel postcursor ISI or other inference effects. To support the THP coding at the transmitter circuitry, the receiver circuitry may send data on the transmit channel conditions, for example, conditions diagnosed or measured from previously received transmissions, back to the transmitter circuitry. For example, the data may include an impulse response estimate from channel estimator circuitry at the receiver circuitry. The transmitter circuitry may then use the received channel condition data to generate a precoder that cancels or otherwise mitigates postcursor ISI at the receiver circuitry.

In some implementations, the cable length may be selected or capped for various protocols. The cable length may be selected such that effects from delay due to cable length are held below selected or predetermined thresholds. Additionally or alternatively, signal robustness may also be increased by increasing error coding block sizes. However, increasing error coding block size may also increase datastream latency.

FIG. 1 provides a context for the further discussion of phantom mode datastream transmission system. FIG. 1 shows example network nodes 100, 180 within a network 199. In the network 199, networking nodes 100 route packets from sources to destinations across any number and type of networks (e.g., the Ethernet/TCP/IP network). The networking nodes 100 may take many different forms and may be present in any number. The nodes 100 may include routers and switches, set-top boxes, servers, rack mount devices, computers, laptops, televisions, video game consoles, bridges to other networks, or other devices, for instance; however other types of networking nodes 100 may also be present throughout the network 199. The physical media for transport over the network 199 may include paired conductor cables.

In FIG. 1, an example node 100 includes one or more communication interfaces 102, system circuitry 104, input/output interface circuitry 106, and a display 108 on which the node 100 generates a user interface 109. The communication interfaces 102 may include one or more transmitters and receivers circuitry ("transceivers") 138 and any antennas 140 used by the transceivers 138. The transceivers 138 may provide physical layer interfaces for any of a wide range of communication protocols 142, such as any type of Ethernet, data over cable service interface specification (DOCSIS), digital subscriber line (DSL), multimedia over coax alliance (MoCA), or other protocol. When the communication interfaces 102 support cellular connectivity, the node 100 may also include a SIM card interface 110 and SIM card 112 or any other form of cellular data storage/interface. The example node 100 can also include one or more storage devices, such as hard disk drives 114 (HDDs) and/or solid state disk drives 116, 118 (SDDs).

In some implementations, the transceivers circuitry 138 may include phantom mode transport (PMT) circuitry 200 to support coupling of both differential mode and common mode signals onto paired conductor media, such as one or more pairs of conductor media.

The user interface 109 and the input/output interface circuitry 106 may include and/or support one or more of a graphical user interface (GUI), touch sensitive display, voice or facial recognition inputs, buttons, switches, speakers and other user interface elements. Additional examples of the input/output interface circuitry 106 supported and/or provided can include one or more of microphones, video and still image cameras, headset and microphone input/output jacks, Universal Serial Bus (USB) connectors, memory card slots, and other types of inputs. The input/output interface circuitry 106 may further include and/or support magnetic or optical media interfaces (e.g., a CDROM or DVD drive), serial and parallel bus interfaces, and keyboard and mouse interfaces.

The system circuitry 104 may include any combination of hardware and can include at least portions of the hardware that executes or is operational with software, firmware, or other logic. The system circuitry 104 may be implemented, for example, with one or more systems on a chip (SoC), application specific integrated circuits (ASIC), discrete analog and digital circuits, and other circuitry. The system circuitry 104 is part of the implementation of any desired functionality in the node 100. In that regard, the system circuitry 104 may include circuitry that facilitates phantom mode transmission over paired conductor media.

The system circuitry 104 may include one or more processors 120 and memories 122. The memory 122 and storage devices 114, 116 store, for example, control instructions 124 and an operating system 126. The processor 120 executes the control instructions 124 and the operating system 126 to carry out any of the described functionality for the node 100. The control parameters 128 provide and specify configuration and operating options for the control instructions 124, operating system 126, and other functionality of the example node 100.

Figure 2:
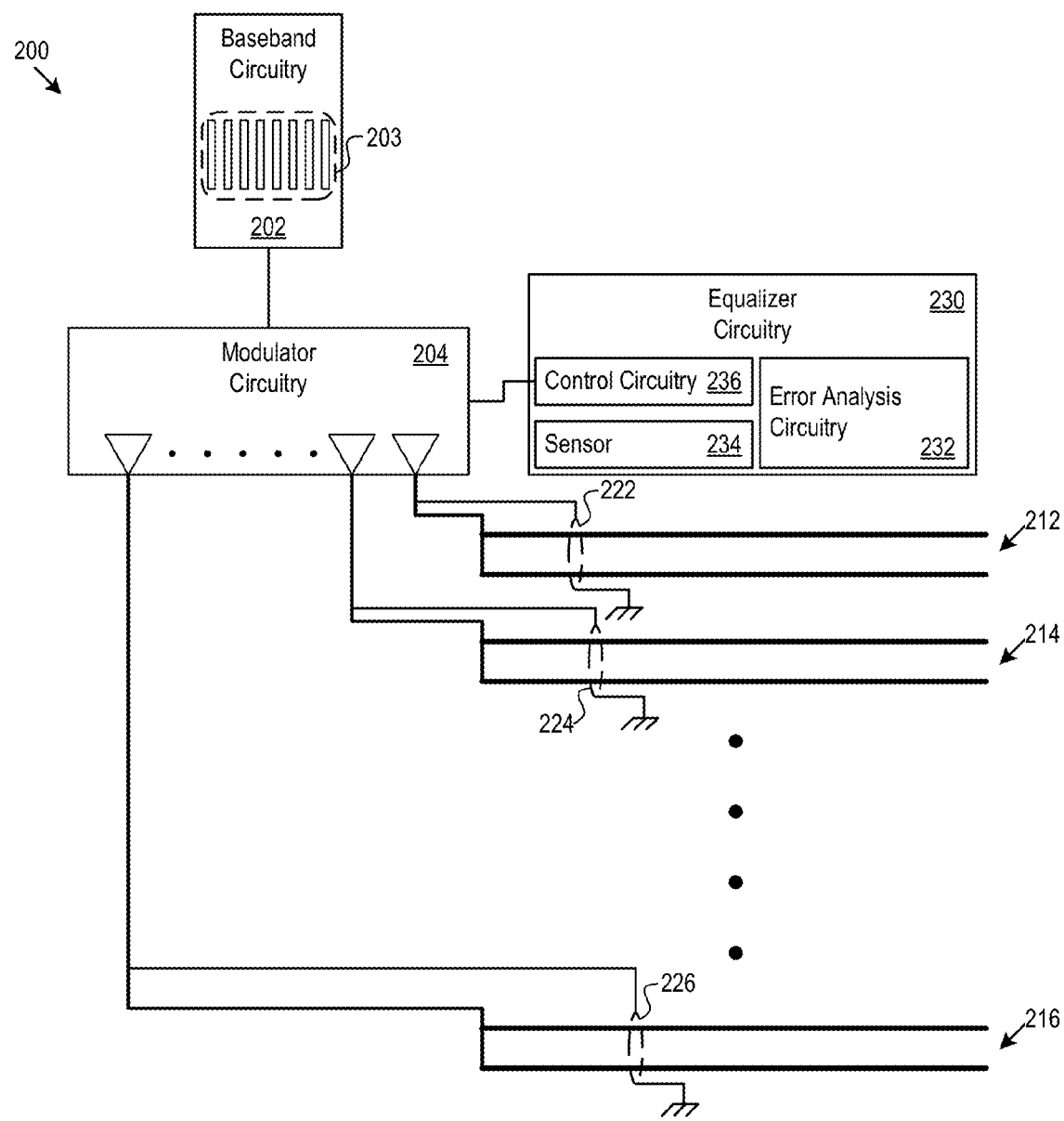
FIG. 2 shows example phantom mode transport (PMT) circuitry.

FIG. 2 shows example PMT circuitry 200. The example PMT circuitry may include baseband circuitry 202; modulator circuitry 204, such as digital-to-analog converters (DACs), analog-to-digital converters (ADCs), drivers, amplifiers and or other signal processing circuitry; paired conductor media 212, 214, 216, such as a twisted wire pair; and equalizer circuitry 230.

The baseband circuitry 202 may receive data for transmission from various sources, such as applications, operating systems, or other data sources, the baseband circuitry 202 may also generate data to support protocol signaling, packet encapsulation or other processes. The baseband circuitry 202 may divide the data into datastreams which may be held in buffers 203. The datastreams may carry parts of or whole packets, error correction blocks, or other signaling data. For example, the datastreams may carry bits from a single buffer 203 in a round robin fashion or other distribution scheme. In another example, the datastreams may have separate buffers and may carry data from separate packets, error correction blocks, or other encapsulation units. In some cases, the baseband circuitry may divide the data for transmission into the multiple datastreams to facilitate distribution of the data for transmission over the multiple available differential, common, or phantom modes rather than sending the data over a single mode or restricted number of modes.

The baseband circuitry 202 may send the multiple datastreams to the modulator circuitry for coupling to the transmission modes of the paired conductor media 212, 214, 216. In some cases, the paired conductor media may be shielded with a shield 221 formed as a shielding layer 222, 224, 226 coupled to a reference, such as ground.

In an example implementation, the baseband circuitry 202 may send three datastreams to the modulator circuitry for transport over the paired conductor media 212, 214. Two datastreams may be transmitted over the differential modes of the paired conductor media 212, 214. The third datastream may be transmitted over the common mode of paired conductor media 212, and a return signal for the third datastream, for example, a signal of opposite polarity to the datastream on the common mode, may be transmitted over the other paired conductor media 214. The three datastreams are then transported by the paired conductor media 212, 214—two datastreams using differential modes and one datastream on a phantom mode.

Although the example above discusses transport of three datastreams over the two paired conductors 212, 214, the PMT circuitry 200 may transport additional datastreams using additional phantom, common, and differential modes signals of the paired conductors 212, 214, 216.

The equalizer circuitry 230 may include sensors 232, error correction circuitry 234, or other circuitry to detect the channel state information of the various signaling modes used in datastream transport. For example, the equalizer circuitry may monitor incoming signal levels to determine insertion loss, via sensors 232, for the paired conductor media 212, 214, 216.

The equalizer circuitry 230 may analyze the insertion loss data by frequency and determine frequency regions of degraded transmission for the various modes. The equalizer circuitry may further include control circuitry 236, which may include instructions to cause the modulator circuitry 204 to alter the transmission band for a signaling mode, for example, in the phantom mode signaling, to avoid the region of degraded transmission.

Additionally or alternatively, the equalizer circuitry 230 may obtain channel state information from the error correction circuitry 232. The error correction circuitry 232 may be used to determine a bit-error rate (BER) or symbol-error rate (SER). The BER or SER may be used to estimate a signal-to-noise ratio (SNR) for a mode.

In some cases, the equalizer circuitry 230 may obtain the SNR using the sensor 232 and measuring a signal level and a noise floor level. The equalizer circuity 230 may calculate the signal level by analyzing of incoming traffic or by analyzing reference blocks with known content. The equalizer circuitry 230 may calculate the noise floor by analyzing levels during periods of no activity.

Additionally or alternatively, various formulations of the SNR may be calculated. For example, the equalizer circuitry 230 may calculate an SNR using a time-averaged signal level versus a time-averaged noise level. The equalizer circuitry 230 may calculate an SNR using a signal level averaged over a frequency band (such as, a transmission band for a phantom mode signal) versus noise level averaged over the same band. In some cases, the equalizer circuitry 230 may calculate a Salz SNR using averaged values instead calculating insertion loss extrema and noise level extrema.

The equalizer circuitry 230 may send the channel state information to the baseband circuitry 202 for transport to other nodes. In this fashion, nodes on both sides of a link may exchange channel state information and be aware of changes to the transmission modes that are detected on either side of a link. The channel state information may be sent in packets, such as channel state packets, or other encapsulated data formats. For example, channel quality indicators (CQIs) or other data structures used in cellular protocols may be implemented by the equalizer.

The equalizer circuitry 230 may use the channel state information to mitigate time-varying mode transmission states. For example, cellular transmissions, such a LTE/LTE-A, GSM, CDMA, or other cellular transmissions may overlap with carrier frequencies sent over the paired conductor media. The cellular transmissions may couple to the paired conductor media and interfere with the transported signals. Actively collected and exchanged channel state information may allow the equalizer circuitry 230 to avoid frequency bands where external signal inference sources cause signal degradation beyond a selected level, for example a threshold BER, SER, SNR, or other channel state metric.

Figure 3:
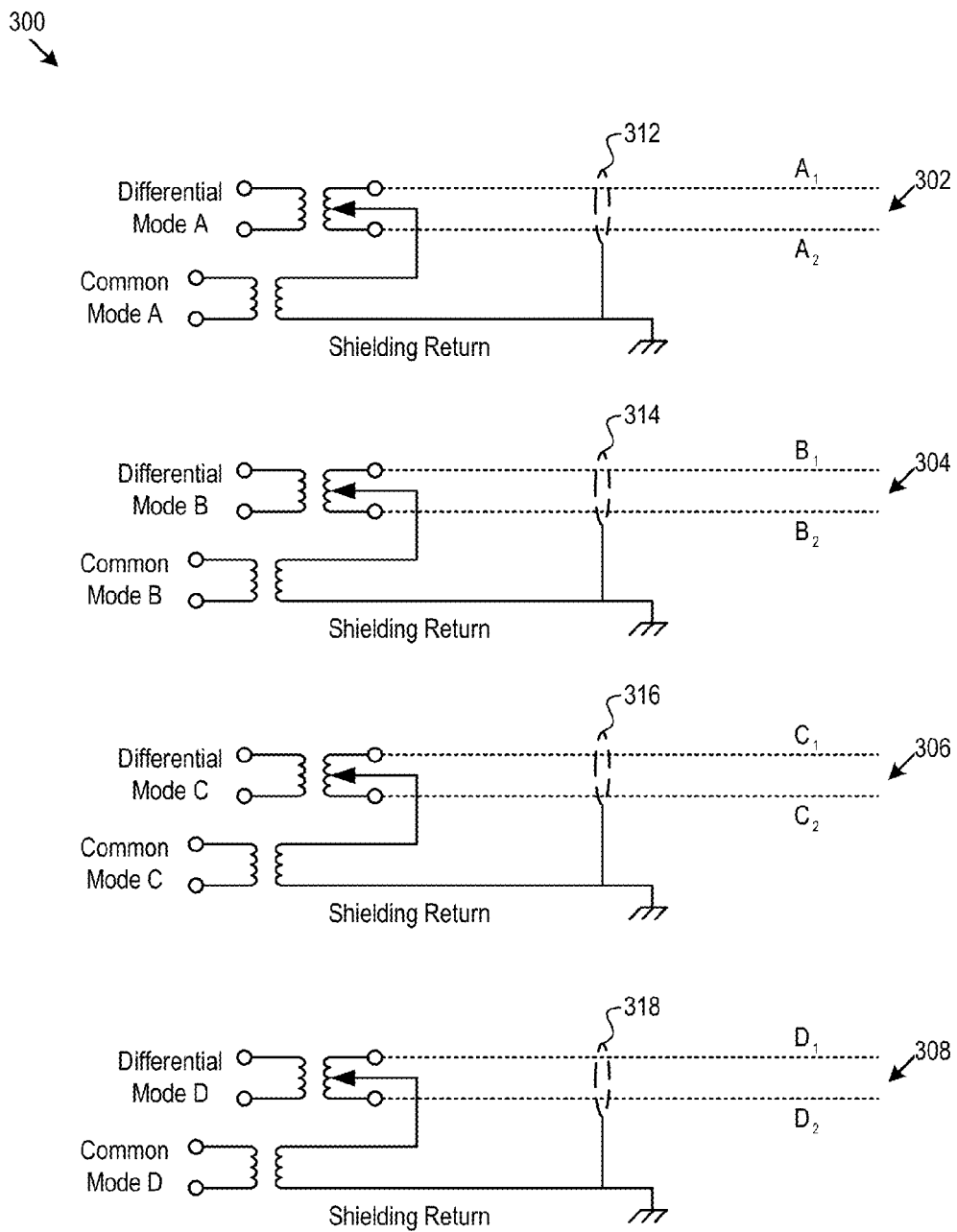
FIG. 3 shows an example four conductor pair physical media system.

FIG. 3 shows an example four conductor pair 302, 304, 306, 308 physical media system 300. The four conductor pairs may be identified as pair A 302, pair B 304, pair C 306, and pair D 308. The pairs may have individual shielding included in shielding layers 312, 314, 316, 318. In the example system, eight datastreams may be transported over the four conductor pairs. The system may transport four datastreams over the differential mode signaling of pairs A 302, B 304, C 306, and D 308. Further, four datastreams may be sent by the system over the common mode signaling of pairs A 302, B 304, C 306, and D 308. Return mode signals for the common mode datastreams may be transported by the system over shielding layers 312, 314, 316, 318.

The matrix below shows the signaling for sending differential and common mode signals over the four conductor pairs in the example system 300:

$$\frac{1}{\sqrt{2}} \begin{bmatrix} & A_1 & A_2 & B_1 & B_2 & C_1 & C_2 & D_1 & D_2 \\ \text{Diff-}A & 1 & -1 & 0 & 0 & 0 & 0 & 0 & 0 \\ \text{Diff-}B & 0 & 0 & 1 & -1 & 0 & 0 & 0 & 0 \\ \text{Diff-}C & 0 & 0 & 0 & 0 & 1 & -1 & 0 & 0 \\ \text{Diff-}D & 0 & 0 & 0 & 0 & 0 & 0 & 1 & -1 \\ \text{Com-}A & 1 & 1 & 0 & 0 & 0 & 0 & 0 & 0 \\ \text{Com-}B & 0 & 0 & 1 & 1 & 0 & 0 & 0 & 0 \\ \text{Com-}C & 0 & 0 & 0 & 0 & 1 & 1 & 0 & 0 \\ \text{Com-}D & 0 & 0 & 0 & 0 & 0 & 0 & 1 & 1 \end{bmatrix}$$

Figure 4:
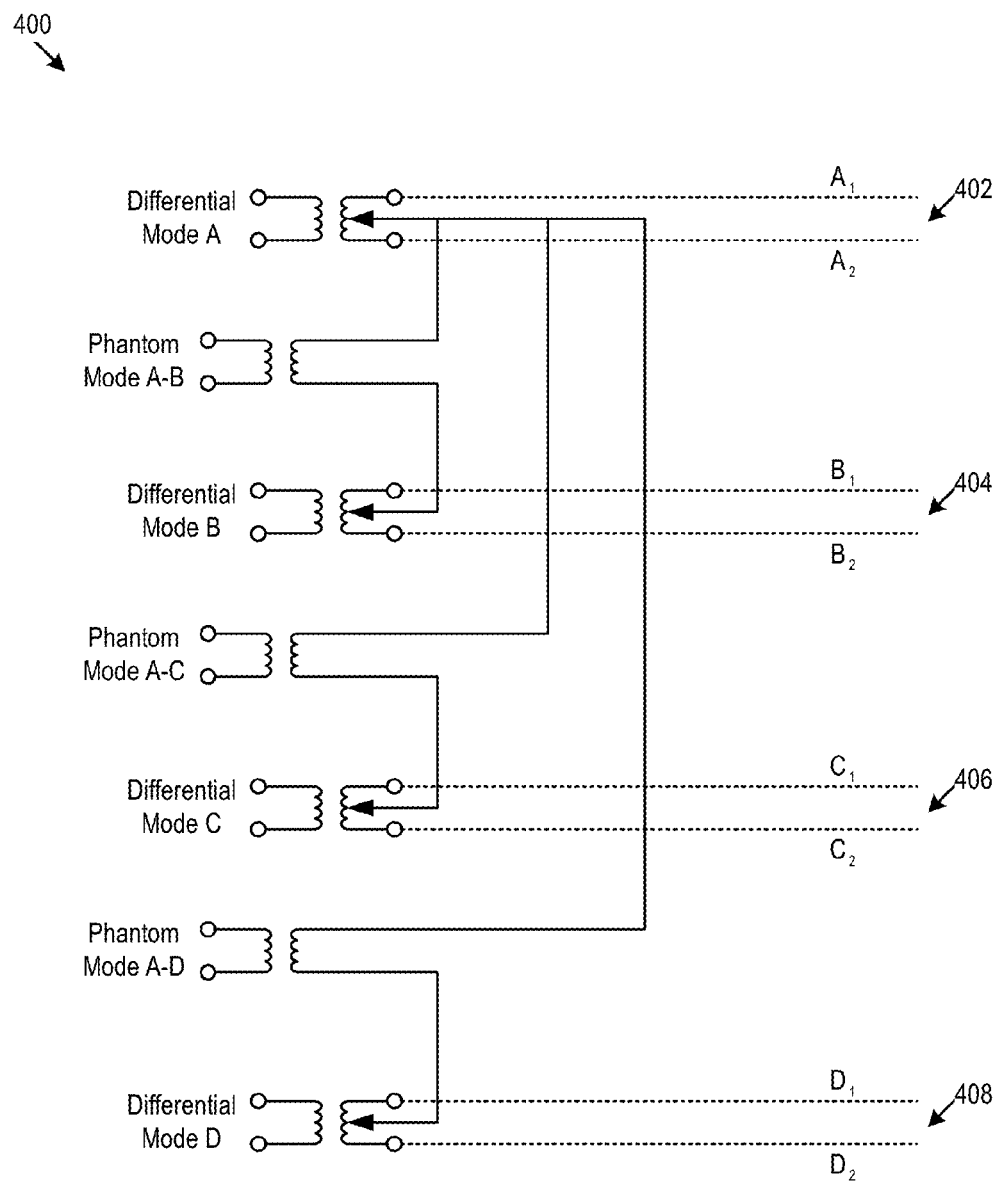
FIG. 4 shows a second example four conductor pair physical media system.

FIG. 4 shows a second example four conductor pair 402, 404, 406, 408 physical media system 400. The four conductor pairs may be identified as pair A 402, pair B 404, pair C 406, and pair D 408. In the example system, seven datastreams may be transported over the four conductor pairs. The system may transport four datastreams over the differential modes of pairs A 402, B 404, C 406, and D 408. Further, three datastreams may be sent by the system over phantom modes of pairs A 402, B 404, C 406, and D 408. Pair A 402 may carry a combined return signal for datastreams transported on common mode signals on pairs B 404, C 406, and D 408. The resulting phantom mode signaling may be identified as A-B, A-C, and A-D. When no symbols (e.g., within a datastream) are modulated on any of the signaling modes, the system 400 may send a uniform interference signal on the paired wires to support dirty paper coding schemes. The system 400 may also send channel condition data between the receiver and transmitter to support THP schemes.

The matrix below shows the signaling for sending differential and phantom mode signals over the four conductor pairs in the example system 400:

$$\frac{1}{\sqrt{2}}\begin{bmatrix} & A_1 & A_2 & B_1 & B_2 & C_1 & C_2 & D_1 & D_2 \\ \text{Diff-}A & 1 & -1 & 0 & 0 & 0 & 0 & 0 & 0 \\ \text{Diff-}B & 0 & 0 & 1 & -1 & 0 & 0 & 0 & 0 \\ \text{Diff-}C & 0 & 0 & 0 & 0 & 1 & -1 & 0 & 0 \\ \text{Diff-}D & 0 & 0 & 0 & 0 & 0 & 0 & 1 & -1 \\ \text{Phantom-}A\text{-}B & \frac{1}{\sqrt{2}} & \frac{1}{\sqrt{2}} & -\frac{1}{\sqrt{2}} & -\frac{1}{\sqrt{2}} & 0 & 0 & 0 & 0 \\ \text{Phantom-}A\text{-}C & \frac{1}{\sqrt{2}} & \frac{1}{\sqrt{2}} & 0 & 0 & -\frac{1}{\sqrt{2}} & -\frac{1}{\sqrt{2}} & 0 & 0 \\ \text{Phantom-}A\text{-}D & \frac{1}{\sqrt{2}} & \frac{1}{\sqrt{2}} & 0 & 0 & 0 & 0 & -\frac{1}{\sqrt{2}} & -\frac{1}{\sqrt{2}} \\ - & \frac{1}{2} & \frac{1}{2} & \frac{1}{2} & \frac{1}{2} & \frac{1}{2} & \frac{1}{2} & \frac{1}{2} & \frac{1}{2} \end{bmatrix}$$

Figure 5:
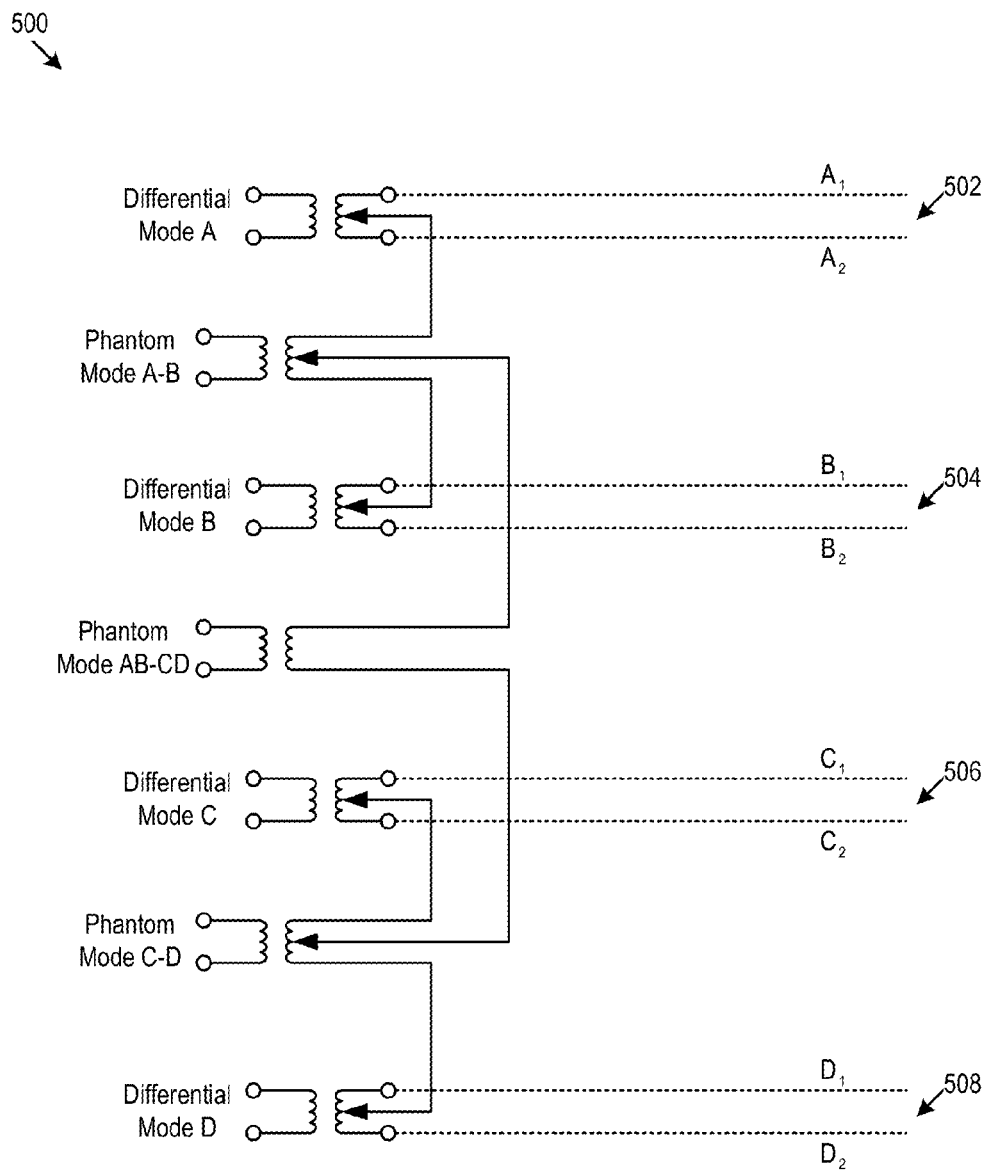
FIG. 5 shows a third example four conductor pair physical media system.

FIG. 5 shows a third example four conductor pair 502, 504, 506, 508 physical media system 500. The four conductor pairs may be identified as pair A 502, pair B 504, pair C 506, and pair D 508. In the example system, seven datastreams may be transported over the four conductor pairs. The system may transport four datastreams using the differential mode signaling of pairs A 502, B 504, C 506, and D 508. Further, three datastreams may be sent by the system using phantom mode signaling of pairs A 502, B 504, C 506, and D 508. Rather than having a single pair carry combined return signals for the other pairs, the system 500 uses phantom modes A-B, C-D, and AB-CD. The phantom mode A-B may include the differential of the common mode signaling of pair A versus the common mode signaling of pair B. The phantom mode C-D may include the differential of the common mode signaling of pair C versus the common mode signaling of pair D. The phantom mode signaling AB-CD may include the differential of the common mode signaling of the four conductors of pairs A and B versus the common mode signaling of the pairs C and D. AB may be the combined common mode of the common mode of pair A and the common mode of pair B. CD may be the combined common mode of the common mode of pair C and the common mode of pair D. When no symbols (e.g., within a datastream) are modulated using any of the modes, the system 500 may send a uniform interference signal on the wires to support dirty paper coding schemes. The system 500 may also send channel condition data between the receiver and transmitter to support THP schemes.

The matrix below shows the signaling for sending differential and phantom mode signals over the four conductor pairs in the example system 500:

$$\frac{1}{\sqrt{2}}\begin{bmatrix} & A_1 & A_2 & B_1 & B_2 & C_1 & C_2 & D_1 & D_2 \\ \text{Diff-}A & 1 & -1 & 0 & 0 & 0 & 0 & 0 & 0 \\ \text{Diff-}B & 0 & 0 & 1 & -1 & 0 & 0 & 0 & 0 \\ \text{Diff-}C & 0 & 0 & 0 & 0 & 1 & -1 & 0 & 0 \\ \text{Diff-}D & 0 & 0 & 0 & 0 & 0 & 0 & 1 & -1 \\ \text{Phantom-}A\text{-}B & \frac{1}{\sqrt{2}} & \frac{1}{\sqrt{2}} & -\frac{1}{\sqrt{2}} & -\frac{1}{\sqrt{2}} & 0 & 0 & 0 & 0 \\ \text{Phantom-}C\text{-}D & 0 & 0 & 0 & 0 & \frac{1}{\sqrt{2}} & \frac{1}{\sqrt{2}} & -\frac{1}{\sqrt{2}} & -\frac{1}{\sqrt{2}} \\ \text{Phantom-}AB\text{-}CD & \frac{1}{2} & \frac{1}{2} & \frac{1}{2} & \frac{1}{2} & -\frac{1}{2} & -\frac{1}{2} & -\frac{1}{2} & -\frac{1}{2} \\ - & \frac{1}{2} & \frac{1}{2} & \frac{1}{2} & \frac{1}{2} & \frac{1}{2} & \frac{1}{2} & \frac{1}{2} & \frac{1}{2} \end{bmatrix}$$

For systems with N paired conductors, a modulator may transmit up to N or more datastreams using the differential modes of the N paired conductors. Concurrently, phantom mode modulators may couple up to N−1 or more data streams on to the phantom mode signaling of the N paired conductors for a total of up to 2N−1 or more datastreams.

Figure 6:
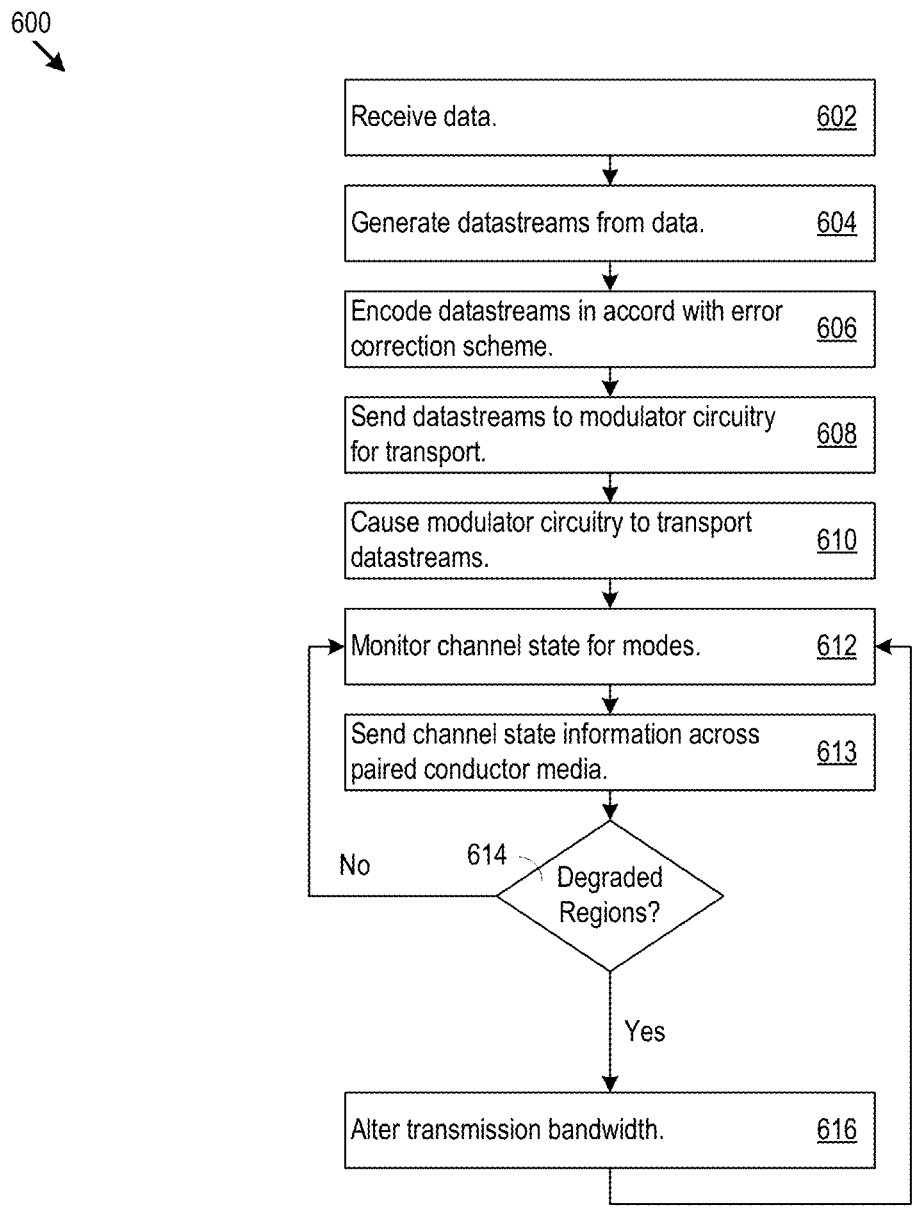
FIG. 6 shows example PMT logic.

FIG. 6 shows example PMT logic 600, which may be implemented by, for example, PMT circuitry 200. The PMT logic 600 may receive data (602). For example, the PMT logic 600 may receive data from applications or other sources for transport at baseband circuitry (e.g., baseband circuitry 202). The PMT logic 600 may generate datastreams from the received data (604).

The PMT logic 600 may encode the datastreams in accordance with an error correction scheme (606). For example, the PMT logic 600 may encapsulate the datastreams in forward error correction blocks or other error correction block types. The length of the blocks may be selected based on delay characteristics of the paired conductor system. For example, the length of the paired conductor cable may contribute to delay. The total delay of the system including cable length may be considered when determining error correction parameters such as a block length.

The PMT logic 600 may send the datastreams to modulator circuitry for transport over the pair conductor cables (608). The modulator circuitry may include phantom mode modulators, common mode modulators, and differential modulators. The PMT logic 600 may cause the modulators to transport the datastreams over the paired conductors using the phantom modes, common modes, differential modes, or any combination thereof (610).

The PMT logic 600 may further monitor the channel state for the various modes (612). The PMT logic 600 may send the channel state information of another node across the paired conductor media (613). The PMT logic may determine whether degraded transmission frequency regions are present within the transmission bands of any one or more of the signaling modes (614). If no degraded transmission frequency regions are found, the PMT logic may return to monitoring the channel states (612). If a degraded transmission frequency region is found, the PMT logic 600 may cause respective modulator circuitry to alter the transmission bandwidth of a single carrier using the corresponding mode (616).

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Various implementations have been specifically described. However, many other implementations are also possible.

We claim:

1. A device comprising:
    modulator circuitry coupled to a data cable, the data cable comprising a shielded wire pair, the modulator circuitry configured to:
        transmit a differential signal carrying a first datastream over a differential mode of the shielded wire pair,
        transmit a common mode signal carrying a second datastream over a common mode of the shielded wire pair, and
        receive a return signal for the common mode signal over shielding of the shielded wire pair;
    baseband circuitry coupled to the modulator circuitry, the baseband circuitry configured to provide the first and second datastreams to the modulator circuitry; and
    equalizer circuitry configured to identify a degraded transmission region within a transmission spectrum of the common mode of the shielded wire pair.

2. The device of claim 1, wherein the equalizer circuitry is further configured to cause the modulator circuitry to alter a transmission band of the common mode signal to avoid the degraded transmission region.

3. The device of claim 2, wherein the equalizer circuitry is configured to cause the modulator circuitry to shift a carrier frequency of at least one of the differential signal or the common mode signal to alter the transmission band.

4. The device of claim 2, wherein the equalizer circuitry is configured to cause the modulator circuitry to adjust a transmission bandwidth of at least one of the differential signal or the common mode signal to alter the transmission band.

5. The device of claim 1, wherein the modulator circuitry is further configured to:
    transmit second, third, and fourth differential signals carrying third, fourth and fifth datastreams over the second, third, and fourth differential modes of the second, third and fourth shielded wire pairs of the data cable; and
    transmit second, third, and fourth common mode signals carrying sixth, seventh and eighth datastreams over second, third, and fourth common modes of the second, third, and fourth shielded wire pairs of the data cable.

6. The device of claim 1, wherein the baseband circuitry is configured to allocate at least a portion of the first datastream, at least a portion of the second datastream, or both for transmission of measured channel state information for the differential mode, the common mode, or both.

7. A method for modulator circuitry coupled to a data cable, the data cable comprising a shielded wire pair, the method comprising:
    transmitting, with the modulator circuitry, a differential signal carrying a first datastream over a differential mode of a shielded wire pair;
    transmitting, with the modulator circuitry, a common mode signal carrying a second datastream over a common mode of the shielded wire pair;
    receiving, with the modulator circuitry, a return signal for the common mode signal over shielding of the shielded wire pair;
    providing, with baseband circuitry coupled to the modulator circuitry, the first and second datastreams to the modulator circuitry; and identifying, with equalizer circuitry, a degraded transmission region within a transmission spectrum of the common mode of the shielded wire pair.

8. The method of claim 7, further comprising:
transmitting, with the modulator circuitry, four differential signals over four differential modes of four separate conductor pairs,
wherein the four separate conductor pairs are housed within a single outer cable jacket.

9. The method of claim 8, further comprising carrying a respective datastream over each of the four differential signals; and
carrying a datastream over a differential between a first common mode of a return conductor pair and a second common mode of another conductor pair as a phantom mode signal.

10. The method of claim 9, further comprising transmitting a packet carrying channel state information for at least one of the first and second common modes.

11. The method of claim 10, further comprising:
sending an indicator of the degraded transmission region within the packet carrying the channel state information.

12. The method of claim 9, wherein the datastreams comprise Ethernet datastreams.

13. The method of claim 9, further comprising:
receiving channel condition data; and
responsive to the channel condition data, coding the phantom mode signal with Tomlinson-Harashima precoders to cancel an interference effect.

14. A system comprising:
first differential modulator circuitry coupled to a first conductor pair, the first differential modulator circuitry configured to transmit a first differential signal along the first conductor pair;
second differential modulator circuitry coupled to a second conductor pair, the second differential modulator circuitry configured to transmit a second differential signal along the second conductor pair;
first phantom mode modulator circuitry coupled to the first conductor pair and a third conductor pair, the first phantom mode modulator circuitry configured to:
transmit a first phantom mode signal over a differential of a first common mode of the first conductor pair and a third common mode of the third conductor pair;
second phantom mode modulator circuitry coupled to the second and third conductor pairs, the second phantom mode modulator circuitry configured to:
transmit a second phantom mode signal over a differential of a second common mode of the second conductor pair and the third common mode of the third conductor pair.

15. The system of claim 14, wherein:
the first differential modulator circuitry is configured to modulate a first datastream onto the first differential signal;
the second differential modulator circuitry is configured to modulate a second datastream onto the second differential signal;
the first phantom mode modulator circuitry is configured to modulate a third datastream onto the first phantom mode signal; and
the second phantom mode modulator circuitry is configured to modulate a fourth datastream onto the second phantom mode signal.

16. The system of claim 15, further comprising baseband circuitry configured to provide the first, second, third, and fourth datastreams.

17. The system of claim 16, wherein:
the baseband circuitry comprises an Ethernet baseband processor; and
the first, second, third, and fourth datastreams comprise Ethernet datastreams.

18. The system of claim 14, further comprising equalizer circuitry configured to identify a degraded transmission region within a transmission spectrum of the first common mode of the first conductor pair.

19. The system of claim 14, further comprising equalizer circuitry configured to:
generate channel state information for the first and second common modes; and
transmit the channel state information using the first differential signal, second differential signal, third differential signal, first phantom mode signal, the second phantom mode signal, or any combination thereof.

* * * * *